US009405930B2

(12) United States Patent
Vestevich

(10) Patent No.: US 9,405,930 B2
(45) Date of Patent: Aug. 2, 2016

(54) USER-CONTROLLED CENTRALIZED PRIVACY MARKETPLACE SYSTEM

(71) Applicant: Jacqueline K. Vestevich, Chicago, IL (US)

(72) Inventor: Jacqueline K. Vestevich, Chicago, IL (US)

(*) Notice: Subject to any disclaimer, the term of this patent is extended or adjusted under 35 U.S.C. 154(b) by 0 days.

(21) Appl. No.: 14/206,742

(22) Filed: Mar. 12, 2014

(65) Prior Publication Data

US 2014/0282852 A1    Sep. 18, 2014

Related U.S. Application Data

(60) Provisional application No. 61/776,929, filed on Mar. 12, 2013.

(51) Int. Cl.
| | |
|---|---|
| G06F 21/00 | (2013.01) |
| G06F 21/62 | (2013.01) |
| G06F 21/52 | (2013.01) |
| G06F 9/46 | (2006.01) |
| G06F 21/55 | (2013.01) |

(52) U.S. Cl.
CPC ............ *G06F 21/6263* (2013.01); *G06F 21/52* (2013.01); *G06F 9/465* (2013.01); *G06F 21/554* (2013.01); *G06F 21/62* (2013.01)

(58) Field of Classification Search
CPC ... G06F 21/52; G06F 21/554; G06F 21/6218; G06F 2221/2145; G06F 9/465; G06F 21/62; G06F 21/6263; H04L 63/0227; H04L 63/10; H04L 63/20
USPC ...................................................... 726/1, 4, 17
See application file for complete search history.

(56) References Cited

U.S. PATENT DOCUMENTS

| | | | | |
|---|---|---|---|---|
| 7,496,191 | B1* | 2/2009 | Crews ................. | G06F 21/6218 379/142.02 |
| 7,912,971 | B1* | 3/2011 | Dunn ............................ | 709/229 |
| 2002/0161766 | A1* | 10/2002 | Lawson .............. | G06F 21/6218 |
| 2009/0249440 | A1* | 10/2009 | Platt .................... | H04L 63/0815 726/1 |
| 2009/0254971 | A1* | 10/2009 | Herz ...................... | G06Q 10/10 726/1 |
| 2009/0276840 | A1* | 11/2009 | Cao et al. .......................... | 726/9 |
| 2013/0036058 | A1* | 2/2013 | Kelly et al. ..................... | 705/67 |
| 2013/0252594 | A1* | 9/2013 | Faillaci et al. ............. | 455/414.2 |

\* cited by examiner

*Primary Examiner* — Don Zhao
(74) *Attorney, Agent, or Firm* — Richards Patent Law P.C.

(57) ABSTRACT

A system for managing personal information of a user includes: a personal information database including personal information records of the user including data associated with the user, wherein a user is associated with a data policy including at least one permission for an accessing party to interact with a personal information record; and a data access module that receives and responds to requests from an accessing party, wherein a request may be one of: a read request specifying a personal information record to be read; and a write request specifying a personal information to be written to a personal information record to be written, wherein in response to a write request, the data access module responds with the a personal information record to be read, or updates the personal information record to be written in the personal information database, if permitted by the personal information record the privacy policy.

6 Claims, 8 Drawing Sheets

USER-CONTROLLED CENTRALIZED PRIVACY MARKETPLACE SYSTEM

CROSS-REFERENCE TO RELATED APPLICATIONS

This application incorporates by reference and claims priority to U.S. Provisional Patent Application No. 61/776,929 filed Mar. 12, 2013.

BACKGROUND OF THE INVENTION

The present subject matter relates generally to systems and methods for centralizing the management and control of personal information to the consumer. More specifically, the present invention relates to a marketplace for users to share personal information with businesses by creating and subscribing to privacy policies, joining privacy pools, or promoting privacy policy subscriptions to other users.

The vast quantity of personal information that is generated and monitored has become unmanageable. Countless companies and organizations record and track consumer activities and attributes and the resulting personal information is distributed over a vast array of websites and databases of these third parties. For example, personal information for consumers is tracked by businesses, industries, and analytics systems employed to target consumers with marketing and sales campaigns based on their buying and browsing history. Likewise, personal information for banking customers is tracked and managed by financial institutions to target customers with marketing and sales campaigns based on their spending and money management histories. Further, personal information for medical patients is collected, managed and used by individual medical providers or groups of providers, government agencies (e.g. Medicare) and third party insurance agents and their consultants, to provide personalized medical services.

These third parties have traditionally had separate collection policies that may be difficult or impossible for consumers to manage or control. Consumers have wanted to know what personal information is collected and manage how it is used. Moreover, consumers have wanted mechanisms to share personal information to third parties they trust to receive services they want or need, like personalized deals, medical services, or banking services. However, existing systems do not provide mechanisms for consumers to manage, control, share, or sell their personal information.

Third parties often have a legitimate need for some or all of the data they collect. Third parties often include data service providers that use personal data to provide custom services to consumers. For example, a chain store may use personal data to generate useful deals, a doctor may use personal data to give health advice, and a bank may user personal information to give a discount on a loan, etc. To most efficiently provide these services, data service providers often need up-to-date, accurate, holistic information.

However, personal information collected by third parties is inherently flawed because they do not contain the whole picture of the living habits of any particular individual. Rather, third parties collect only those bits of data from which the third party has direct tracking capabilities; such as when a consumer shares personal information in the purchase of a product. In some instances, third parties may purchase additional bits and pieces of personal information from data vendors. However, personal information from data vendors is also fragmented and incomplete.

Further, data service providers and other third parties have desired to provide consumers greater access and control to their data but have limited means to do so. Consumers have often been overwhelmed by the number of businesses that collect their personal data and may not know where to begin to find and use all of the prior mechanisms created by data service providers and other third parties to permit access and control to their data.

What has been needed is a system that centralizes the access, distribution and control of personal information. Further, what has been needed is a centralized system to learn about one's personal information stored across different databases and websites. Even further, what has been needed is a system to allow data service providers to access users personal information under the control of users.

Accordingly, there is a need for a privacy marketplace system that centralizes the management and control of personal information to the user, as described herein.

BRIEF SUMMARY OF THE INVENTION

To meet the needs described above and others, the present disclosure provides a privacy marketplace system that centralizes the management and control of personal information to the user. More specifically, the present invention relates to a marketplace for users to share personal information with businesses by creating and subscribing to privacy policies, joining privacy pools, or promoting privacy policy subscriptions to other users.

The privacy marketplace system may collect into a central database the personal information provided by a user and personal information of that user stored by various third parties. This collection process may be automatic and routine so that the information in the centralized database is up-to-date. Information may be collected in various "bins" of related personal information. A user may view the information, make corrections as needed, and populate new information. Changes to the centralized database may be pushed back out to third parties according to privacy policies to keep information up-to-date.

A privacy policy specifies what personal information a business may collect about a user, and permits the business to access the same personal information from the privacy marketplace system, if available. In some embodiments, businesses may be enabled by the privacy marketplace system to compensate users for a subscription to a privacy policy.

In the present application, when a consumer permits one or more businesses to collect and access data about her according to a privacy policy, the consumer is said to subscribe to that privacy policy. Likewise, when a business agrees to manage and receive access to a user's personal information according to a privacy policy, the business is also said to subscribe to the policy for that user. It is contemplated that one consumer may subscribe to one policy with a business and another consumer may subscribe to a different policy with the same business in accordance with each consumers' preferences. Additionally, multiple consumers and businesses may be subscribed to any given privacy policy.

A privacy pool is a collection of consumers that have pooled together to collectively subscribe to one or more privacy policies. A privacy pool may include a group of businesses that agree to be bound by the privacy policies of the pool. In some embodiments, a user may only join a privacy pool by the referral of an existing user. This permits users to be compensated for referrals as part of a multi-level marketing plan.

In an embodiment, a user may use a device to interact with the privacy marketplace system over a network, such as the Internet. Using the privacy marketplace system, the user may create, edit and subscribe to various privacy policies, interact with other users, join groups of people with related privacy interests, interact with business, and other related privacy and social networking activities. A business may use the privacy marketplace system to receive personal information of users at its business servers, promote business privacy policies, and otherwise interact with users.

The privacy marketplace system may be embodied in a server including a controller and instructions to carry out the functionality of the privacy marketplace system as described herein. The privacy marketplace system may further include a mobile application including instructions that, when executed by a device, communicate with the server carry out the functionality described herein. The privacy marketplace system may provide a user interface that the user may access to use the functionality provided by the privacy marketplace system.

In an example, a user profile screen may be provided by the privacy marketplace system. The profile screen may show the privacy policies to which a user has privacy policy subscriptions. For each privacy policy subscription, the profile screen may show the rewards that the user has received from that policy. The profile screen may also show the privacy pools to which the user is a member. Further, the profile screen may show the user's friends in the privacy marketplace system. When a user is visiting her own user profile screen, a news feed may list the user activity of the user's friends.

In an example, a privacy policy editing screen may be provided by the privacy marketplace system to allows users to configure permissions for various information bins of a privacy policy, such as demographics, home, health, financial, business, etc. Each bin may include sub-bins, and sub-bins may be subdivided into further sub-bins. When editing a policy, a user may, for example, indicate with a privacy input whether a business may collect a particular item of information, share information with third parties, and/or access items of information from the privacy marketplace system. The user may further, for example, indicate if items of information collected by a business may be kept permanently or must be held only temporarily, such as a period of ninety days. To permit the user to understand the information a category of information refers to, previews of the information of the user may be presented. An edit history box may show the editing history of the privacy policy.

The privacy marketplace system may additionally include a privacy policy subscription screen to describe a privacy policy offer (e.g., an invitation to subscribe to a privacy policy), including the business or businesses to which the privacy policy will apply. The privacy policy subscription screen may include a list of rewards that are offered for subscribing to the privacy policy. A policy preview may describe the access terms of the privacy policy. A subscribed friends box may show the user those friends in the privacy marketplace system that have subscribed to the privacy policy. In other embodiments, if a business does not currently offer privacy policy subscriptions to a particular privacy policy, the privacy policy subscription screen may provide a mechanism to contact a business about offering privacy policy subscriptions for the privacy policy.

When a user subscribes to a privacy policy, she may be encouraged to share her privacy policy subscription with her friends. Details of the privacy policy subscription may be populated in a user news feed of the privacy marketplace system. The user may also be provided the option of sharing her privacy policy subscriptions to other social networks, blogs, or social media platforms.

A privacy policy may include the privacy policy contract between the users, one or more businesses, and the privacy marketplace system that specifies the obligations that bind the parties regarding personal information. A privacy policy may include one or more privacy policy data files used by the privacy marketplace system that include information describing the privacy policy. The privacy policy data files may include free form text, contractual provisions, structured data formats, electronic signatures, membership lists, identifying information, and other information that one of ordinary skill in the art will recognize as describing the rights, obligations, and agreement between the parties.

A privacy pool may be built around a current or proposed privacy policy. Users may join a privacy pool to encourage businesses to adopt a privacy policy. In some embodiments, businesses may join together to form privacy pools to promote particular privacy policies.

A user may join and participate in a privacy pool using a privacy pool screen. The privacy pool screen may include a pool description, and a preview of a privacy policy associated with a privacy pool. A user may click a join button to join the privacy pool. A membership section may include information about current members, such as profile links, membership numbers, a directory, etc. The privacy pool may include membership actions, for example, the user may choose to edit the privacy policy, write a letter to target businesses to promote the privacy policies of the privacy pool, propose to target a business to accept the privacy policies of the privacy pool, or get a code for this policy that would generate an access token, described below, to easily direct businesses to the privacy policy for subscription.

In some embodiments, a privacy pool may have multiple privacy policies as candidate privacy policies, alternate privacy policies for members, etc. For example, a privacy pool might be created to promote an existing privacy policy promulgated by a business. Alternatively, a privacy pool may be created to promote the privacy needs of certain communities. As yet another example, a privacy pool may be created to maximize the rewards received from businesses.

To permit a user to browse or search for privacy policies or pools, the privacy marketplace system may include a marketplace screen. In an example, a marketplace screen may allows a user to browse categories of available privacy policy based offers from businesses, and available privacy pools that a user may join. The user may also be permitted to search privacy policies and privacy pools using a search box. The resulting privacy policies and privacy pools may be arranged in a search results list with a small blurb describing each privacy policy and privacy pool. The user may select a blurb to view further details about the privacy policy or privacy pool.

In alternate embodiments, a marketplace screen may include privacy policy recommendations based on the privacy pools joined and privacy policies subscribed by friends of the user. The privacy marketplace system may also provide embeddable privacy policy information to allow organic discovery of privacy policies and privacy pools in web based social media, such as blogs, news sites, etc.

To permit easy sharing of personal information according to a privacy policy, the privacy marketplace system may provide tools to create access tokens. For example, the privacy marketplace system may generate an access token that a user may access on a mobile device to provide to businesses to permit the businesses access to the user's personal data according to a privacy policy. The privacy management system may allow users to share or sell access to their personal information through the access tokens. An access tokens may be associated with a data policy that limits what personal information may be collected, and may allow selective access to specified personal information. An access token may be a QR code, a web address, a unique key, a password, etc. Data services and third parties may use the access token to access the personal information of the personal information management system and use the data in accordance with the data policy.

In an embodiment, a method of permitting a business to allow users to subscribe to privacy policies in privacy marketplace system may include the steps of: receiving a request to register the business with the privacy marketplace system; optionally including business servers information to permit the privacy marketplace system to communicate with the privacy marketplace system; providing the business with communication information to permit the business to communicate with the privacy marketplace system; receiving a user request to subscribe to a desired privacy policy for that business; optionally notifying the business of the user request to subscribe to a privacy policy for that business; receiving an indication of acceptance or rejection from the business to the user request; providing user information to the business in accordance with the privacy policy.

In the first step, the privacy marketplace system receives a request from a business to register with the privacy marketplace system. The request may be a request to register an account with the privacy marketplace system. Alternatively or additionally, the request may be a request to receive personal information of a user. The request may reference one or more access tokens, users, privacy policies, privacy pools, etc.

At the optional next step, the privacy marketplace system receives business servers' information to permit the privacy marketplace system to communicate with the business servers. The business servers' information may be included with the request of step. The business servers' information may include web server addresses, such as IP addresses, that the privacy marketplace system may use to communicate with business servers. This permits the privacy marketplace system to poll the business servers for personal information updates of a user, as may be specified in the privacy policy, or to push personal information updates to the business servers.

Once registered with the privacy marketplace system, the privacy marketplace system may provide the business with communication information to permit the business to communicate with the privacy marketplace system. The communication information may include Application Programming Interface (API) keys that permit the business servers to poll the privacy marketplace system for updates to user information in accordance with various privacy policies. The communication information may further include software, scripts, extensions, business logic, etc., that may be used by the business to configure its business servers to interoperate with the privacy marketplace system.

In the third step, the business receives a user request to subscribe to a privacy policy for the business. The request may be made by the user providing the business with an access token or may be made by the user through the privacy marketplace system. After receiving an access token from a user, the business may use the access token to enroll the user in the privacy policy.

If the user makes a request to subscribe to a privacy policy through the privacy marketplace system, the privacy marketplace system may optionally notify the business of the user request to subscribe to a privacy policy for that business. The optional notification may be used where the user has sought to subscribe to a privacy policy with a business where the privacy policy does not meet pre-approved criteria for acceptance. The notification may take the form of an electronic message, such as an email, to an administrator of a businesses account. Alternatively, the notification may be made to a business data system via an API callback to permit the request to be processed using the businesses' own application logic.

In order to finalize a subscription to a privacy policy, a business may provide, and the privacy marketplace system may receive, an indication of acceptance or rejection of the user request to subscribe to a privacy policy. The indication of acceptance or rejection may be prospective, for example, a business may indicate in advance that certain privacy policies or privacy policies meeting approved characteristics may be automatically accepted or rejected. Alternatively, the indication of acceptance or rejection may be made in response to a notification of a user request to subscribe to a policy.

After the business has accepted the user request to subscribe to a privacy policy, the privacy marketplace system may begin providing user information to the business in accordance with the privacy policy.

By providing a privacy marketplace system that allows users to track and manage their own browsing, buying, spending, and other commercial, social, and medical activities, the user will then control the most holistic version of their personal information and habits, which they can then choose to share, sell, block, etc., as they desire. Further, such a marketplace may permit businesses to access information about a user in a manner that respects user privacy while permitting businesses to create more accurate marketing campaigns that more directly speak to the facts about a particular individual or group of individuals, etc. These analytics can be combined with other holistic datasets from other individuals and used to create more effective social networks, more accurate marketing campaigns, that more directly speak to the facts about a particular individual or group of individuals, etc.

Further, users may furnish third parties with dedicated personal QR Codes or Near Field Communication sensors or similar digital communication/relay methods to enable third parties to track consumer spending and browsing activities and store them in the relevant bin in the personal information management system.

In an embodiment, a system for managing personal information of a user includes: a personal information database including personal information records of the user, wherein personal information records include any data associated with the user, wherein a user is associated with a data policy, and wherein a data policy includes at least one permission for an accessing party to interact with a personal information record, wherein the permission may be one of a read permission, and write permission; and a data access module that receives and responds to requests from an accessing party, wherein a request may be one of: a read request specifying a personal information record to be read, wherein in response to a read request, the data access module responds with the a personal information record to be read if permitted by the read permission of the personal information record of the privacy policy; and a write request specifying a personal information to be written to a personal information record to be written, wherein in response to a write request, the data access module updates the personal information record to be written in the personal information database with the personal information to be written if permitted by the write permission of the personal information record the privacy policy.

In some embodiments, the permission may further be a share permission, and wherein a request may further be: a share request to share a personal information record with a third party, the share request specifying a personal information record to be shared, wherein in response to a share request, the data access module responds with a message indicating that the personal information record to be shared may be shared if permitted by the share permission of the personal information record the privacy policy.

In some embodiments, the system for managing personal information of a user further includes an access token generator that, in response to a user request, generates an access token and provides the access token to the user, wherein when the data access module receives an access token from an accessing party, the data access module updates at least one permission of the data policy for the accessing party. Additionally, in some embodiments, the access token is provided as a QR code. Further, in some embodiments, the data access module receives an access token from an accessing party, the data access module further provides the accessing party the data policy associated with the access token.

In some embodiments, the system for managing personal information of a user further includes: a data viewer that enables a user to view and edit personal information records associated with the user; and a data policy editor including a user interface for viewing and subscribing to one or more available data policies, wherein subscribing to a chosen policy of the one or more available data policies associates personal information records of the user with the chosen policy. In some embodiments, the data policy viewer includes a social network.

In some embodiments, a request may further be a registration request including business servers information, wherein in response to the registration request, the data access module, in response to an update to the personal information of a personal information record including a read permission of the privacy policy permitting read access to an accessing party, pushes the update to the personal information to a business server specified by the business servers information.

An object of the invention is to provide a solution to the distributed, uncontrolled nature of personal information.

Another object of the invention is to provide a solution to permit consolidation of personal information management on a single platform under the control of the consumer.

An advantage of the invention is that it provides a mechanism for consumers to be compensated directly for their own personal information rather than having their information controlled by third-parties at the consumer's expense.

Another advantage of the invention is that it provides a mechanism for users to pool their resources and influence to negotiate with businesses.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
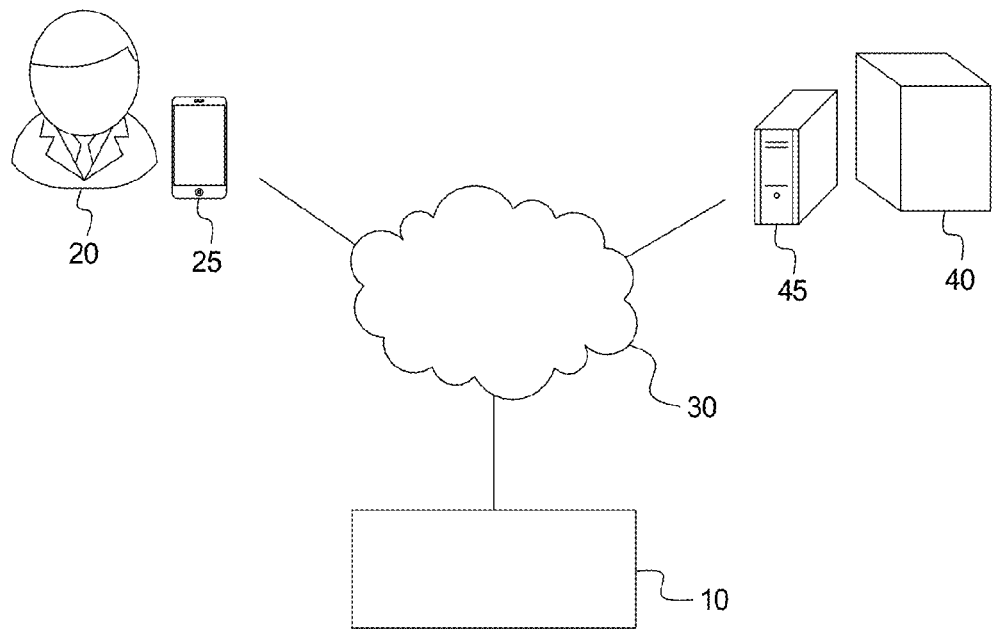
FIG. 1 illustrates the ecosystem of an example of a privacy marketplace system.

FIG. 1 illustrates the ecosystem of an example of a privacy marketplace system 10. As shown in FIG. 1, a user 20 may use a device 25 to interact with the privacy marketplace system 10 over a network 30, such as the Internet. Using the privacy marketplace system 10, the user 20 may create, edit and subscribe to various privacy policies, interact with other users 20, join groups of people with related privacy interests, interact with a business 40, and carry out other related privacy and social networking activities. The business 40 may use the privacy marketplace system 10 to receive personal information of users 20 at its business servers 45, promote business privacy policies, and otherwise interact with users 20.

The privacy marketplace system 10 may be embodied in a server including a controller and instructions to carry out the functionality of the privacy marketplace system as described herein. The privacy marketplace system 10 may further include a mobile application including instructions that, when executed by a device 25, communicate with the server carry out the functionality described herein. The privacy marketplace system 10 may provide a user interface that the user 20 may access to use the functionality provided by the privacy marketplace system 10.

Figure 2:
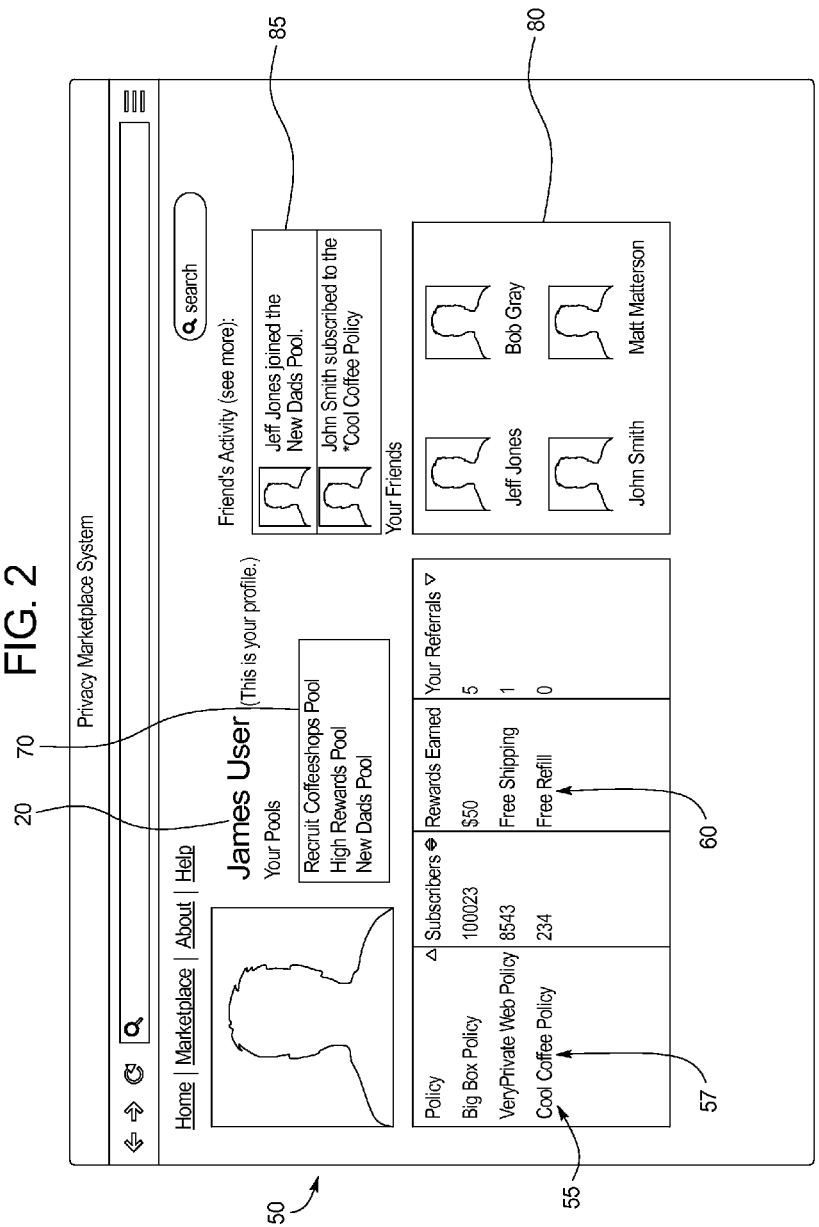
FIG. 2 illustrates a user profile screen of the privacy marketplace system of FIG. 1 describing user details on the privacy marketplace system.

FIG. 2 illustrates a user profile screen 50 of the user interface of the privacy marketplace system 10. The profile screen 50 shows the privacy policies 55 to which a user 20 has privacy policy subscriptions 57. The profile screen 50 may show the rewards 60 that the user 20 has received through the privacy marketplace system 10. The profile screen 50 may also show one or more privacy pools 70 of which the user 20 is a member. The profile screen 50 may also show the friends 80 whom the user 20 has referred and who are increasing the user's rewards 60. In some embodiments, the profile screen 50 may act as a storefront for a user's personal information and may include buttons for a business 40 to subscribe to a privacy policy 55 of the user 20. When a user 20 is visiting her user profile screen 50, the news feed 85 may list changes to the profiles of friends 80.

Figure 3:
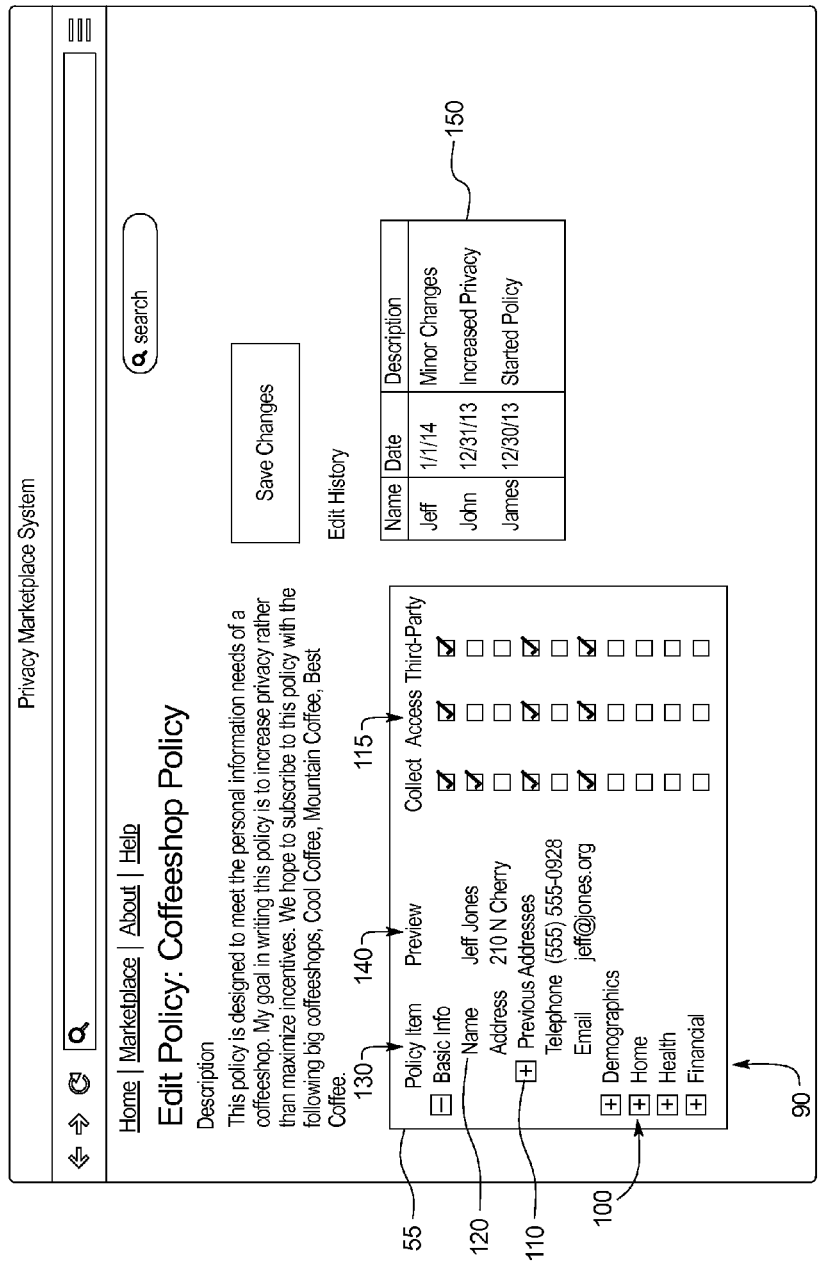
FIG. 3 illustrates a privacy policy editing screen of the privacy marketplace system of FIG. 1 allowing a user to create, edit, and otherwise manage a privacy policy

FIG. 3 illustrates a privacy policy editing screen 90 of the privacy marketplace system 10. The editing screen 90 allows a user 20 to configure permissions for various information bins 100 of a privacy policy 55, such as demographics, home, health, financial, business, etc. Each bin 100 may include sub-bins 110, and sub-bins 110 may be subdivided into further sub-bins 110. When editing a privacy policy 55, a user 20 may, for example, indicate with a privacy input 115 whether a business 40 may collect a personal information record 120, share the personal information record 120 with third parties, access the personal information record 120 from the privacy marketplace system 10, and/or update the personal information record 120. The user 20 may further, for example, indicate if items of information 120 collected by a business 40 may be kept permanently or must be held only temporarily, such as a period of ninety days.

To permit the user 20 to understand the information a category of information 130 refers to, previews 140 of the information of the user 20 may be presented. An edit history box 150 may show the editing history of the privacy policy 55. Due to the large amount of personal information present, the privacy marketplace system 10 may provide analytics/big data systems to automatically data-mine and report on the user's personal data, using techniques such as Bayesian filters. These tools may assist users in understanding and strategically manipulating their personal information to maximize privacy or revenue.

Figure 4:
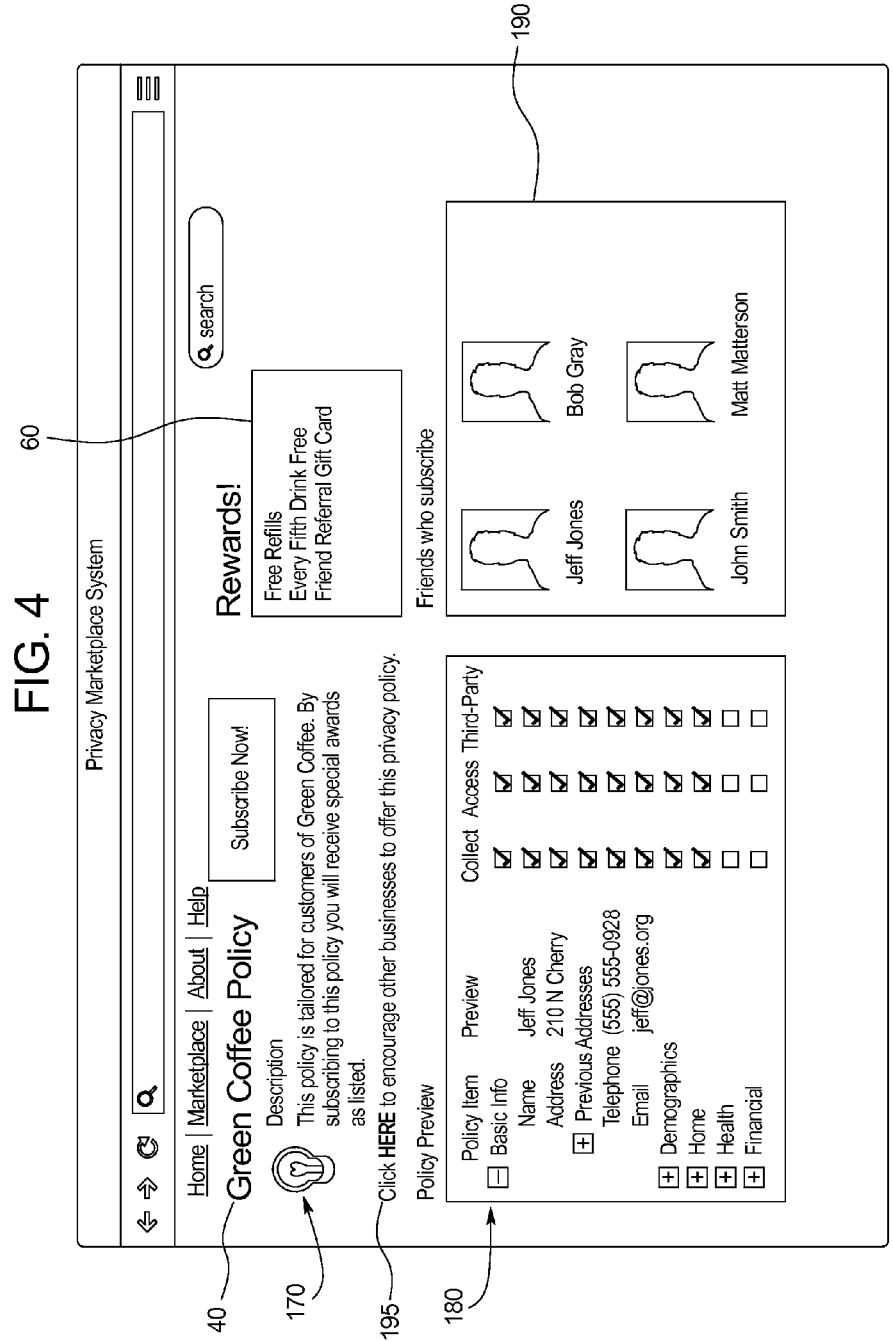
FIG. 4 is a privacy policy subscription screen that describes a privacy policy offer, including the business or businesses to which the privacy policy will apply.

FIG. 4 is a privacy policy subscription screen 160. A privacy policy subscription screen 160 may describe a privacy policy offer 170, including the business 40 or businesses 40 to whom the privacy policy 55 will apply. The privacy policy subscription screen 160 may include a list of rewards 60 that are offered for subscribing to the privacy policy 55. A policy preview 180 may describe the access terms of the privacy policy 55. A subscribed friends box 190 may show the user 20 those friends in the privacy marketplace system 10 who have subscribed to the privacy policy 55. In other embodiments, if a business 40 does not currently offer privacy policy subscriptions 57 to a particular privacy policy 55, the privacy policy subscription screen 160 may provide a mechanism 195 to contact a business 40 about offering privacy policy subscriptions 57 for the privacy policy 55.

When a user 20 subscribes to a privacy policy 55, she may be encouraged to share her privacy policy subscription 57 with her friends 80. Details of the privacy policy subscription 57 may be populated in a user news feed 85 of the privacy marketplace system 10. The user 20 may also be provided the option of sharing her privacy policy subscriptions 57 to other social networks, blogs, or social media platforms.

A privacy policy 55 may include the privacy policy contract between the users 20, one or more businesses 40, and the privacy marketplace system 10 specifying the obligations that may bind the parties regarding personal information. A privacy policy 55 may include one or more privacy policy data files used by the privacy marketplace system 10 that include information describing the privacy policy 55. The privacy policy data files may include free form text, contractual provisions, structured data formats, electronic signatures, membership lists, identifying information, and other information that one of ordinary skill in the art will recognize as describing the rights, obligations, and agreement between the parties. The privacy policy 55 may include various permissions for each of the personal information records 120, such as: collect permissions (whether a business 40 may collect a personal information record 120), share permissions (whether a business 40 may share the personal information record 120 with third parties, and in some embodiments may limit the allowable third parties), access permissions (whether a business 40 may access the personal information record 120 from the privacy marketplace system 10), and write permissions (whether a business may update the personal information record 120 with the privacy marketplace system 10).

A privacy pool 200 may be built around a current or proposed privacy policy 55. Users 20 may join a privacy pool 200 to encourage businesses 40 to adopt a privacy policy 55. In some embodiments, businesses 40 may join together to form privacy pools 200 to promote particular privacy policies 55.

Figure 5:
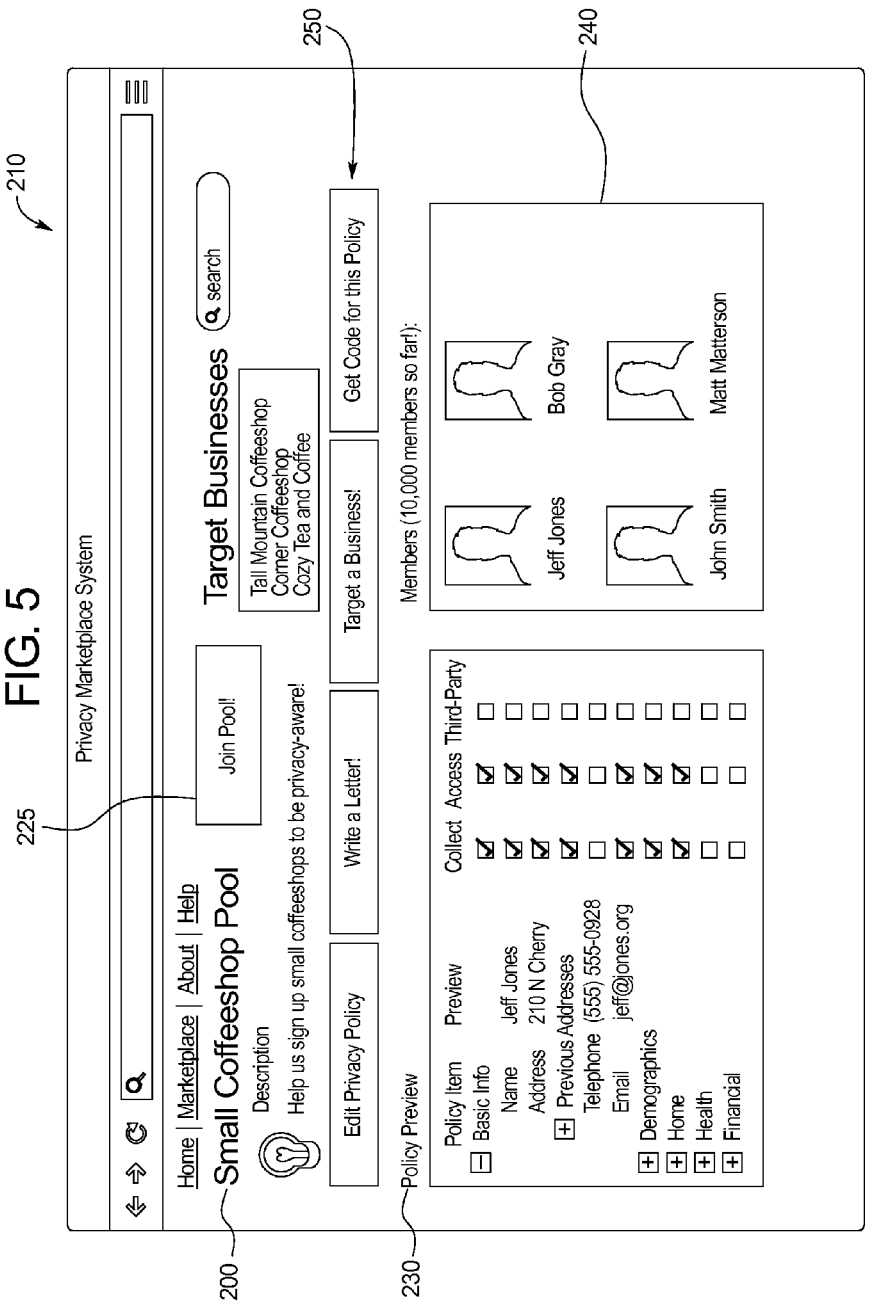
FIG. 5 is a privacy pool screen that allows a user to join and participate in a privacy pool.

FIG. 5 is a privacy pool screen 210 of the privacy marketplace system 10. The privacy pool screen 210 allows a user 20 to join and participate in a privacy pool 200. The privacy pool screen 210 may include a pool description 220, and a preview 230 of a privacy policy 55 associated with a privacy pool 200. A user 20 may click a join button 225 to join the privacy pool 200. A membership section 240 may include information about current members, such as profile links, membership numbers, a directory, etc. The privacy pool 200 may include membership actions 250, in the examples shown in FIG. 5, the user 20 may choose to "edit [the] privacy policy," "write a letter" to target businesses to promote the privacy policies 55 of the privacy pool 200, "target a business" to accept the privacy policies 55 of the privacy pool 200, or "get a code for this policy" that would generate an access token 410 (FIG. 7) to easily direct businesses 40 to the privacy policy 55 for subscription.

In some embodiments, a privacy pool 200 may have multiple privacy policies 55 as candidate privacy policies 55, alternate privacy policies 55 for members, etc. For example, a privacy pool 200 might be created to promote an existing privacy policy 55 promulgated by a business 40. Alternatively, a privacy pool 200 may be created by users 20 to promote multiple privacy policies 55 having similar characteristics and may permit a user to simultaneously subscribe to each of the privacy policies 55 by joining the privacy pool 200.

Figure 6:
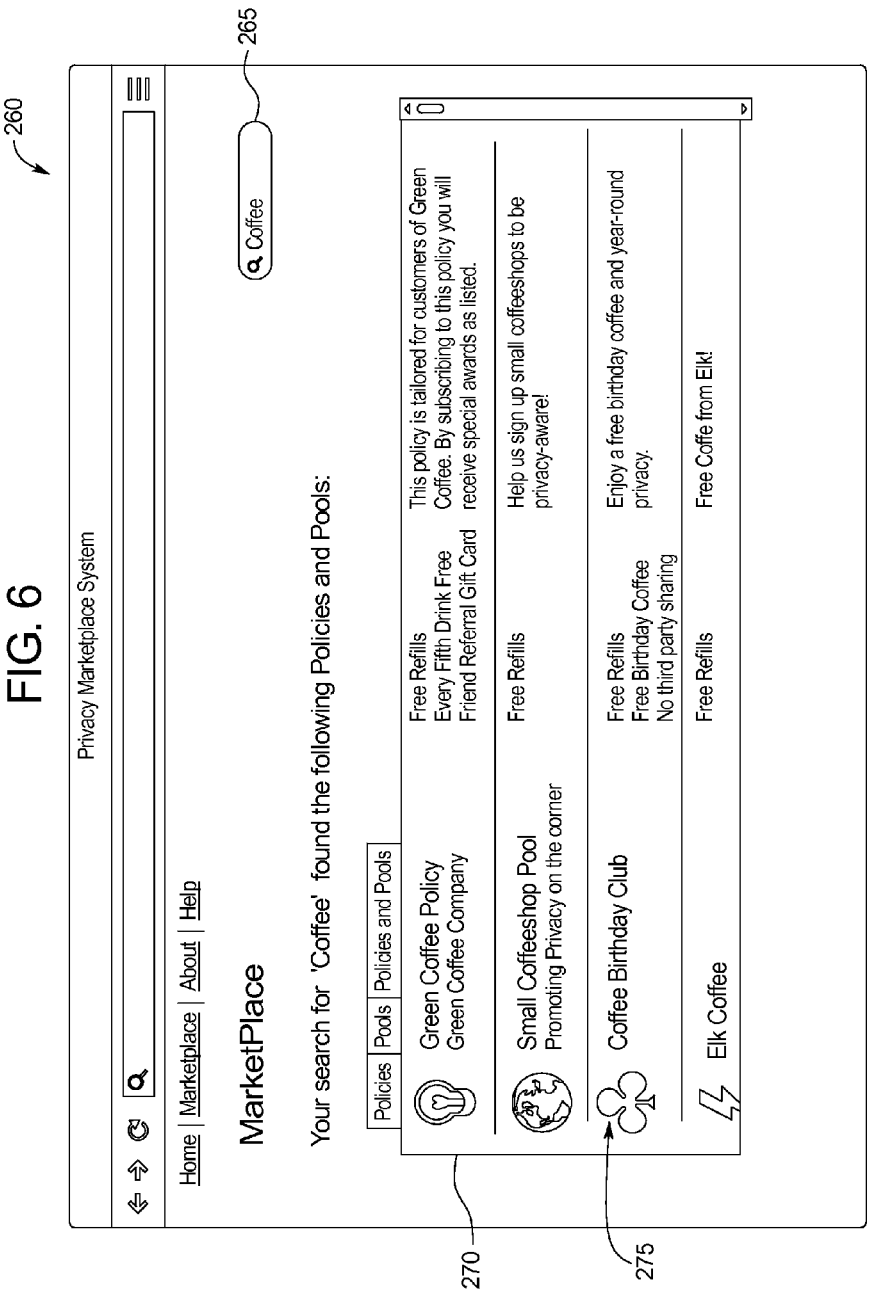
FIG. 6 is a marketplace screen of the privacy marketplace system. The marketplace screen allows the user to view available privacy policy based offers from businesses, and available privacy pools that a user may join.

FIG. 6 is a marketplace screen 260 of the privacy marketplace system 10. The marketplace screen 260 allows the user 20 to view available privacy policy based offers 170 from businesses 40, and available privacy pools 200 that a user 20 may join. The user 20 may search privacy policies 55 and privacy pools 200 using a search box 265. The resulting privacy policies 55 and privacy pools 200 may be arranged in a results list 270 with a small blurb 275 describing each privacy policy 55 and privacy pool 200. The user 20 may select a blurb 275 to view further details about the privacy policy 55 or privacy pool 200.

In alternate embodiments, a marketplace screen 260 may include privacy policy recommendations based on the privacy pools joined and privacy policies subscribed to by friends of the user 20.

Figure 7:
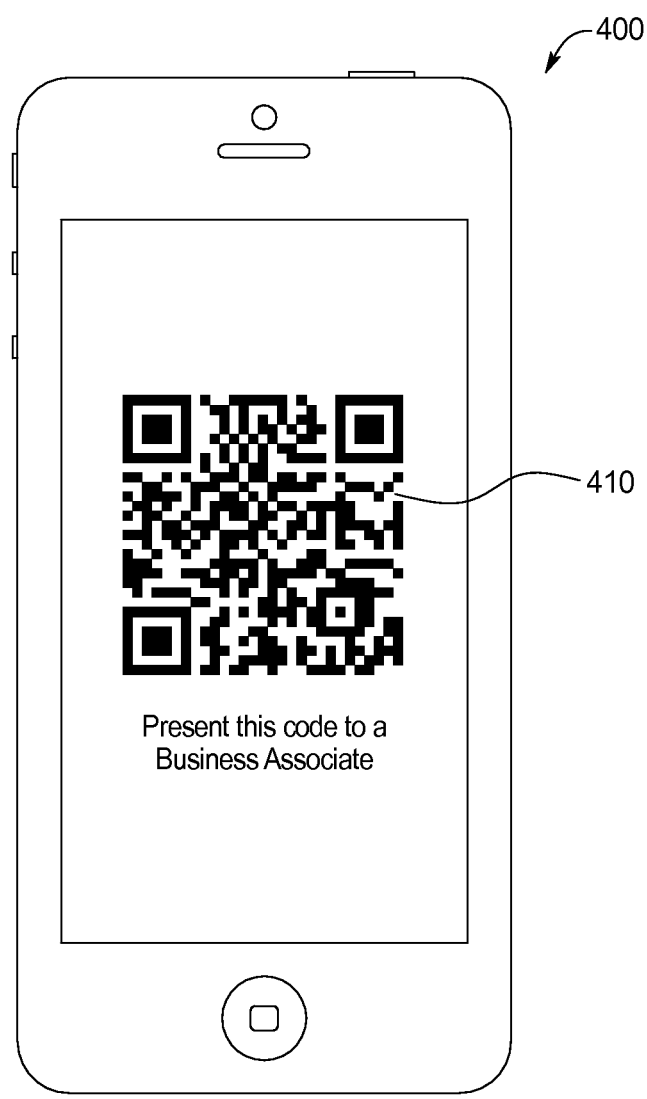
FIG. 7 is an example of a mobile device showing an access token that may be used to easily direct businesses to the privacy policy for subscription.

FIG. 7 illustrates an example of a mobile device 400 displaying an access token 410 that a user 20 may provide to businesses 40 to permit the businesses access to the user's personal data according to a privacy policy 55. The privacy management system 10 allows users 20 to share or sell access to their personal information through access tokens 410 that allow data services and business 40 to access a user's personal data. Access tokens 410 can be associated with a privacy policy 55 that limits what personal information may be collected, and allows selective access to specified personal information.

An access token 410 may be a QR code, a web address, a unique key, a password, fingerprint, IRD technology, etc. Businesses 40 and/or third parties may use the access token 410 to access the personal information of the privacy marketplace system 10 and use the data in accordance with the data policy. In an embodiment, an access token 410 may direct a business 40 to the users profile screen 50. An access token 410 may include information specifying a privacy policy 55, user identification, privacy pool identification, API keys, privacy policy details, user fingerprint, access code permissions or any other information useful to permit the access token 410 to enable users 20 to communicate access credentials to privacy information to a business 40 as will be apparent to those skilled in the art. Along with the access token 410, or as a part of the access token 410, a business 40 may be provided with a password or other visitor access pass. The password or visitor access pass may be used to view the storefront of the user 20, such as the profile screen 50, and/or be used to automatically subscribe to a privacy policy 55 of a user 20.

Figure 8:
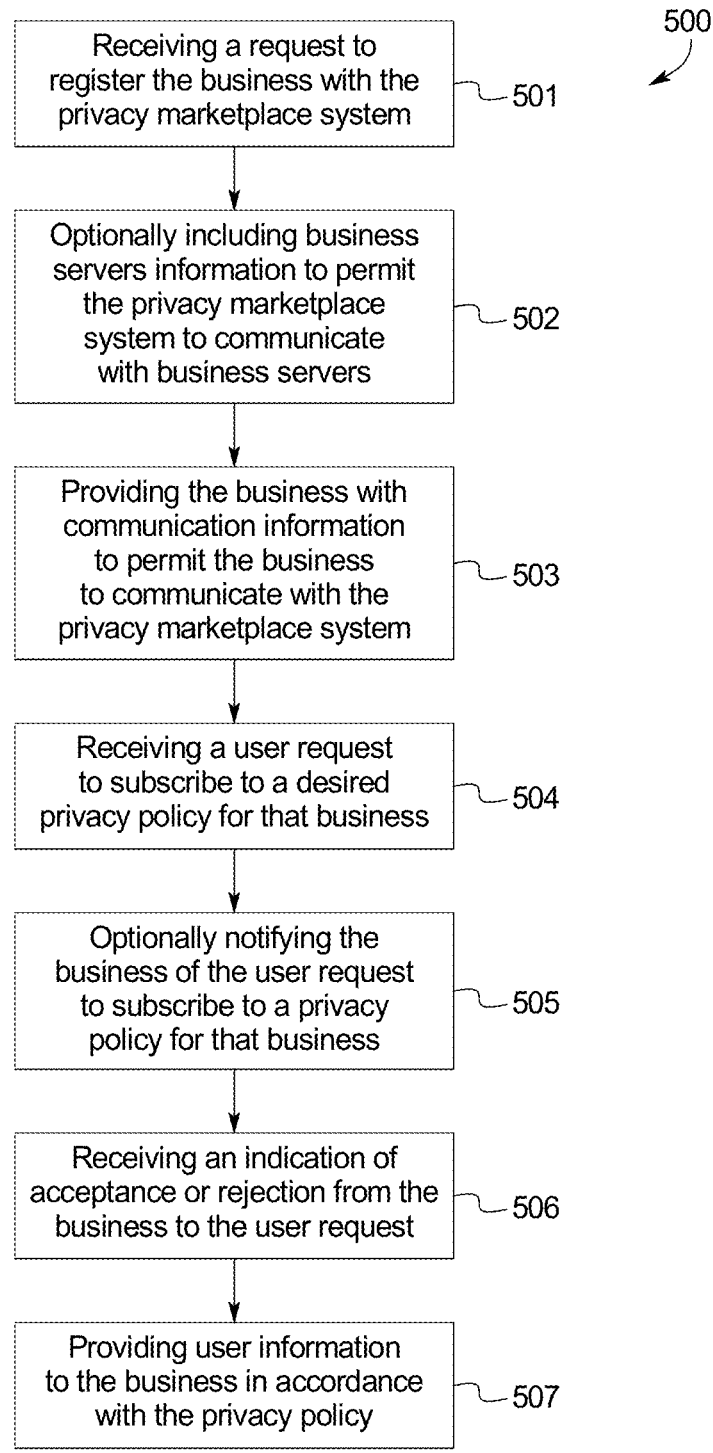
FIG. 8 is an example of a method executed by the privacy marketplace system to enable a business to allow users to subscribe to privacy policies with the business.

Turning to FIG. 8, in an embodiment, a method 500 of permitting a business 40 to allow users 20 to subscribe to privacy policies in privacy marketplace system 10 may include the steps of: step 501 of receiving a request to register the business 40 with the privacy marketplace system 10; step 502 of optionally including business servers information to permit the privacy marketplace system 10 to communicate with the business servers 45; step 503 of providing the business 40 with communication information to permit the business 40 to communicate with the privacy marketplace system 10; step 504 of receiving a user request to subscribe to a desired privacy policy 55 for that business; step 505 of optionally notifying the business 40 of the user request to subscribe to a privacy policy 55 for that business 40; step 506 of receiving an indication of acceptance or rejection from the business 40 to the user request; step 507 of providing user information to the business 40 in accordance with the privacy policy 55.

In the first step, at step 501, the privacy marketplace system 10 receives a request from a business to register with the privacy marketplace system 10. The request may be a request to register an account with the privacy marketplace system 10. Alternatively or additionally, the request may be a request to receive personal information of a user 20. The request may reference one or more access tokens 410, users 20, privacy policies 55, privacy pools 200, etc.

At optional step 502, the privacy marketplace system 10 receives business servers' information to permit the privacy marketplace system 10 to communicate with the business servers 45. The business servers' information may be included with the request of step 501. The business servers' information may include web server addresses, such as IP addresses, that the privacy marketplace system 10 may use to communicate with business servers 45. This permits the privacy marketplace system 10 to poll the business servers 45 for personal information updates of a user 20, as may be specified in the privacy policy 55, or to push personal information updates to the business servers 45.

Once registered with the privacy marketplace system, at step 503, the privacy marketplace system 10 may provide the business 40 with communication information to permit the business 40 to communicate with the privacy marketplace system 10. The communication information may include Application Programming Interface (API) keys that permit the business servers 45 to poll the privacy marketplace system 10 for updates to user information in accordance with various privacy policies 55. The communication information may further include software, scripts, extensions, business logic, etc., that may be used by the business 40 to configure its business servers 45 to interoperate with the privacy marketplace system 10.

In the third step, step 504, the business 40 receives a user request to subscribe to a privacy policy 55 of the business 40. The request may be made by the user 20 providing the business 40 with an access token 410 or may be made by the user 20 through the privacy marketplace system 10. After receiving an access token 410 from a user 20, the business 40 may use the access token 410 to enroll the user 20 in the privacy policy 55.

If the user 20 makes a request to subscribe to a privacy policy 55 through the privacy marketplace system 10, the privacy marketplace system 10 may optionally notify the business 40 of the user request to subscribe to a privacy policy 55 for that business at step 505. The optional notification may be used where the user 20 has sought to subscribe to a privacy policy 55 with a business 40 where the privacy policy 55 does not meet pre-approved criteria for acceptance. The notification may take the form of an electronic message, such as an email, to an administrator of the business's account. Alternatively, the notification may be made to a business servers 45 via an API callback to permit the request to be processed using the business's own application logic.

In order to finalize a subscription to a privacy policy 55, at step 506, a business 40 may provide and the privacy marketplace system 10 may receive an indication of acceptance or rejection of the user request to subscribe to a privacy policy 55. The indication of acceptance or rejection may be prospective, for example, a business 40 may indicate in advance that certain privacy policies 55 or privacy policies 55 meeting approved characteristics may be automatically accepted or rejected. Alternatively, the indication of acceptance or rejection may be made in response to a notification of a user request to subscribe to a privacy policy 55.

After the business 40 has accepted the user request to subscribe to a privacy policy 55, at step 507, the privacy marketplace system 10 may begin providing user information to the business in accordance with the privacy policy. For example, in response to a request by the business 40 to read a personal information record 120, the privacy marketplace system 10 may provide the personal information in the read request to the business 40 if permitted by the privacy policy 55. Likewise, in response to a request by the business 40 to write personal information to a personal information record 120, the privacy marketplace system 10 may updates the personal information record 120 with the personal information if permitted by the write permission associated with the personal information record 120 in the privacy policy. Further if the business 40 has provided the business servers information, the privacy marketplace system 10 may push updates to personal information records 120 to the business servers 45 using the business servers' information.

Aspects of the systems and methods described herein are controlled by one or more controllers. The one or more controllers may be adapted run a variety of application programs, access and store data, including accessing and storing data in associated databases, and enable one or more interactions via the device 25. Typically, the one or more controllers are implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memories and an interconnect bus. The CPU may contain a single microprocessor, or it may contain a plurality of microprocessors for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output displays (e.g., monitors, printers, touchscreen, motion-sensing input device, etc.) and one or more input mechanisms (e.g., keyboard, mouse, voice, touch, bioelectric devices, magnetic reader, RFID reader, barcode reader, touchscreen, motion-sensing input device, etc.) serving as one or more user interfaces for the controller. For example, the one or more controllers may include a graphics subsystem to drive the output display. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a server or a device 25, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A system for centralizing management and control of personal information by user associated with a plurality of privacy policies including at least managing personal information of a first user and personal information of a second user, the system comprising:

a first user interface of the first user to allow the first user to configure permissions for first information bins stored in a personal information database of the system;

a second user interface of the second user to allow the second user to configure permissions for second information bins stored in the personal information database of the system, wherein the first information bins include a first personal information record associated with the first user, wherein the second information bins include a second personal information record associated with the second user;

a controller in communication with the first user interface and the second user interface for data processing associated with the personal information database of the system;

a social relationship database in communication with the controller including a record of a relationship of the first user and the second user; and a memory in communication with the controller, wherein the memory stores instructions that, when executed by the controller, cause the controller to:

provide an application programming interface to an accessing party, wherein the application programming interface receives requests for the first personal information record and the second personal information record, in response to receiving, via the first user interface, the permissions for the first information bins that include a read permission of a first privacy policy for the accessing party to access the first personal information record, associate the permissions for the first information bins and the read permission with the first personal information record in the personal information database of the system, receive, via the application programming interface, a first read request from the accessing party specifying the first personal information record, in response to the first read request, providing the first personal information record to the first accessing party according to the first privacy policy, display, via the second user interface, a privacy policy screen including a description of the first privacy policy, a subscribed friends box showing the second user that a plurality of friends of the first user have subscribed to the first policy including the first user based on the relationship of the first user and the second user in the social relationship database, and an activatable subscription button, receive, from the second user interface, an indication that the second user has edited the permissions for the second bins including a third-party share permission of the second personal information record and that the second user having clicked the subscription button, in response to that the second user has clicked the subscription button, associate, in the personal information database of the system, the second personal information record of the second user with the third party share permission for a second privacy policy, receive, via the application programming interface, a second read request from the accessing party specifying the second personal information record, in response to the second read request, provide the accessing party the second personal information record according to the second privacy policy, wherein the second privacy policy differs from the first privacy policy in that the second privacy policy forbids the accessing party from sharing the second personal information record with third parties.

2. The system of claim 1, further comprising:
an access token generator that, in response to a user request from the first user, generates an access token and provides the access token to the first user, wherein when the controller receives the access token from the accessing party, the controller updates at least one permission of the first privacy policy for the accessing party.

3. The system of claim 2, wherein the access token is provided as a quick response code.

4. The system of claim 2, wherein when the controller receives the access token from the accessing party, the controller further provides the accessing party the first privacy policy associated with the access token.

5. The system of claim 1, further comprising:
a data viewer that enables the first user to view and edit personal information records associated with the first user.

6. The system of claim 1, wherein the controller is further configured to:
receive a registration request from the accessing party including server information from a business server;
wherein, in response to the registration request, the controller associates the business server specified by the server information with the accessing party,
wherein, in response to an update to the second personal information record, the controller pushes the update to the business server when the second read permission of the second privacy policy associated with the second personal information record permits read access to the accessing party.

* * * * *